R. A. VEST.
SEED SELECTING MECHANISM.
APPLICATION FILED JAN. 19, 1918.
1,343,802.
Patented June 15, 1920.
2 SHEETS—SHEET 1.
Fig. 1
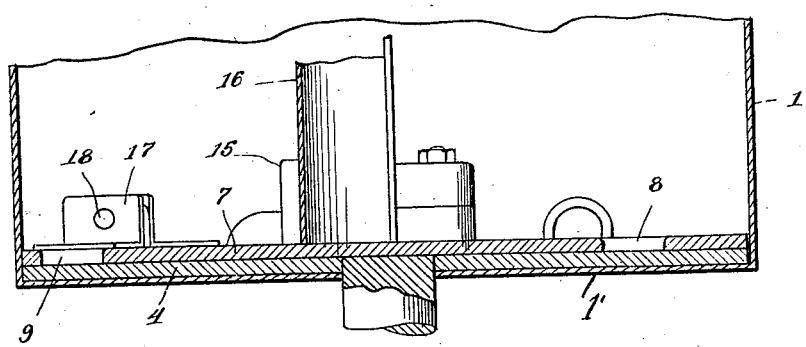
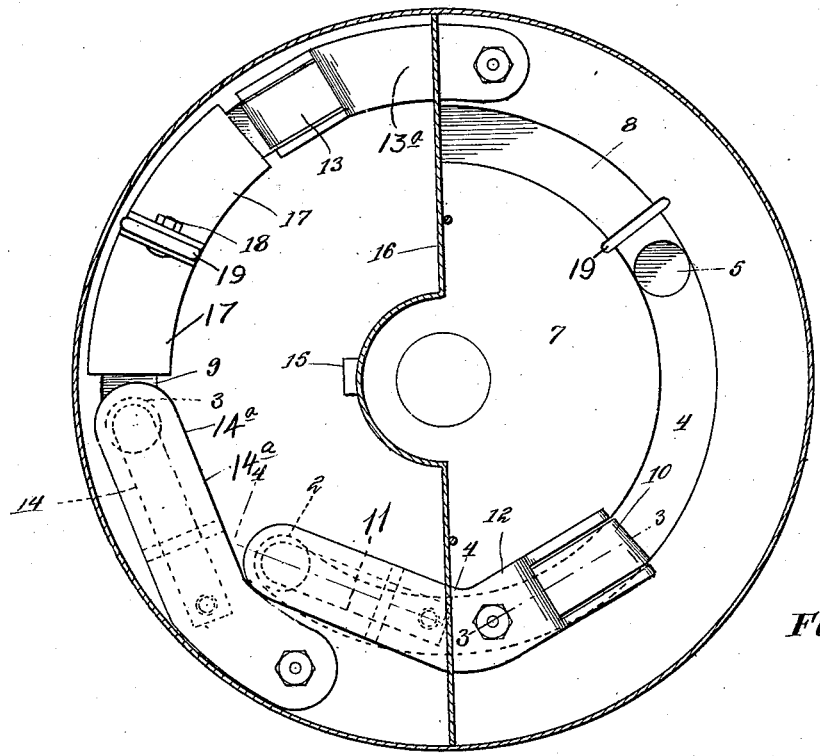
Fig. 2
WITNESSES
INVENTOR
R. A. Vest,
BY Victor J. Evans
ATTORNEY

R. A. VEST.
SEED SELECTING MECHANISM.
APPLICATION FILED JAN. 19, 1918.

1,343,802.

Patented June 15, 1920.
2 SHEETS—SHEET 2.

INVENTOR
R. A. Vest,
BY Victor J. Evans
ATTORNEY

WITNESSES

UNITED STATES PATENT OFFICE.

ROBERT A. VEST, OF PONTOTOC, TEXAS.

SEED-SELECTING MECHANISM.

1,343,802.  Specification of Letters Patent.  Patented June 15, 1920.

Application filed January 19, 1918. Serial No. 212,693.

*To all whom it may concern:*

Be it known that I, ROBERT A. VEST, citizen of the United States, residing at Pontotoc, in the county of Mason and State of Texas, have invented new and useful Improvements in Seed-Selecting Mechanism, of which the following is a specification.

This invention relates to seed selecting mechanisms adapted to be applied to planters and it consists in the novel features hereinafter described and claimed.

An object of the invention is to provide a seed selecting mechanism of simple and durable structure which may be applied to the hopper of a planter of conventional form or pattern and which may be used for planting or dropping two kinds of seed at the same time. The parts of the mechanism are so arranged that they may be readily adjusted whereby but one kind of seed may be planted.

With this object in view the invention consists in providing the bottom of the hopper with openings located at different distances from the center thereof and one opening being located beyond the side of the other. A plate is journaled for rotation above the bottom of the hopper and in contact with the same and is provided with openings adapted to register at times with the openings in the bottom of the hopper. Any suitable means may be provided for rotating the said plate. A guard plate is mounted above the first mentioned plate and is held at a fixed position with relation to the body of the hopper. The said guard plate is provided with elongated, arcuate openings along which the openings in the first mentioned plate are adapted to move as the first mentioned plate rotates. Spring pressed scraper members are located upon the last mentioned plate and operate through the openings thereof to hold back the seed in the hopper except those grains of seed which have been selected and deposited in the openings of the rotating plate. Spring pressed knocker members are also mounted upon the second mentioned plate and operate through the openings therein to knock the seed from the openings in the rotating plate when the said openings are in registration with the openings in the bottom of the hopper. A partition is detachably mounted in the hopper and serves to separate one kind of seed from the other. This partition may be removed when it is desired to use the selecting mechanism for dropping a single kind of seed and in this event strips are applied over one of the openings of the fixed plate whereby the said opening is rendered inactive in so far as the seed selecting and dropping action is concerned.

In the accompanying drawing:—

Figure 1 is a vertical sectional view of the hopper with the seed selecting mechanism applied.

Fig. 2 is a horizontal sectional view of the same.

Fig. 5 is a plan view of a plate used in the hopper.

Figure 3:
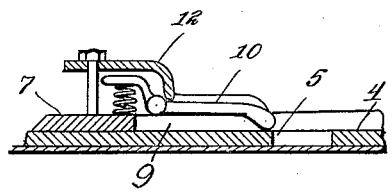
Fig. 3 is a fragmentary detailed sectional view taken on the line 3—3 of Fig. 2.

As illustrated in the accompanying drawing the hopper 1 is of conventional form and the bottom 1' of the said hopper is provided with openings 2 and 3, the opening 2 being located nearer the center of the bottom of the hopper than the opening 3. In Fig. 2 the said openings 2 and 3 in the bottom 1' are illustrated by dotted lines as circular in form. The openings are not in radial alinement with each other. A plate 4 is journaled for rotation above the bottom 1' of the hopper 1 and in contact with the same and the said plate is provided with openings 5 and 6 which at times are adapted to be brought into register with the openings 2 and 3 respectively in the bottom of the hopper. The arrangement of said openings 5 and 6 is shown in Fig. 5. Any suitable means may be provided for rotating the plate 4.

Figure 4:
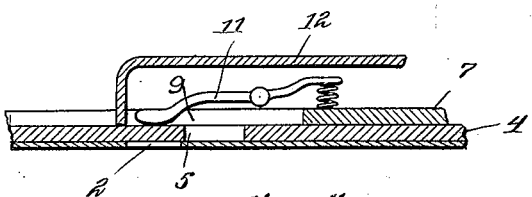
Fig. 4 is a similar view taken on the line 4—4 of Fig. 2.
Figure 3:
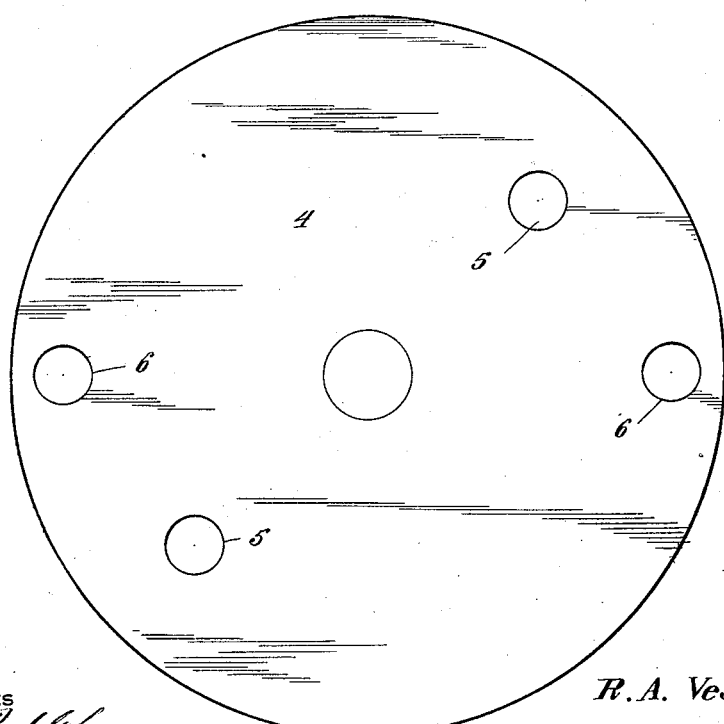

A plate 7 is located above the plate 4 and is held at a fixed position with relation to the hopper 1. The plate 7 is provided with two elongated arcuate openings one indicated at 8 and the other at 9. The openings 5 in the plate 4 are adapted to move under the openings 8 of the plate 7 and the openings 6 of the plate 4 are adapted to move under the openings 9 of the plate 7. A spring pressed scraper 10 is mounted upon the plate 7 and passes through the opening 8 and rests upon the upper surface of the plate 4, Fig. 3. A spring pressed knocker 11, Fig. 4, is also pivotally mounted upon the plate 7 and passes through the opening 8 and is adapted to enter the opening 5 when the said opening passes under the free end of the knocker whereby the knocker may remove seed from the opening. A hood 12, Fig. 2, extends over the upper ends of the scraper 10 and the knocker 11 and houses the springs which actuate the said members. A spring pressed scraper 13 is located at one end of the opening 9 and a spring pressed knocker 14 is located at the other end of the said opening and the last mentioned scraper and knocker are of the same general structural arrangement as the knocker 11 and scraper 10 hereinbefore described, but it will be noted that the scraper 13 and the knocker 14 are covered by separate hoods 13ª and 14ª respectively, Fig. 2.

A lug 15 is carried by the inner portion of the plate 7, and a detachable partition 16 may be connected with the said lug by means of a bolt or other suitable securing device and the partition when in position in the hopper divides the same into two compartments. One compartment may contain one kind of grain as for instance corn and the other compartment may contain a different kind of grain as for instance peas.

From the foregoing description taken in conjunction with the accompanying drawing, it will be seen that when the hopper is supplied with two different kinds of seed and the plate 4 is rotated the openings 5 and 6 will receive grain of the different seed and carry them around and thereby cause them to fall through the openings 2 and 3, the knockers 11 and 14 operating upon the grain when it is above the openings 2 and 3 to remove the grain from the openings 5 and 6 in the plate 4. Owing to the relative location of the openings 2 and 3 one kind of grain will be deposited just in advance of the other kind and thus it is possible to plant corn and peas approximately at the same time or at different times which are spaced for a very short interval.

When it is desired to use the hopper for planting a single kind of grain the partition 16 is removed from the hopper and strips 17 are positioned over the opening 9 and secured by means of a bolt 18 to one of the lugs 19 on plate 7, or in lieu thereof similar strips 17 may be positioned over the opening 8 and secured to the other lug 19.

From the foregoing description taken in conjunction with the accompanying drawings, it will be seen that a seed selecting mechanism of simple and durable structure is provided and that the same may be conveniently used for planting two different kinds of seed and if desired the parts may be adjusted whereby a single kind of seed is selected and dropped.

Having described the invention what is claimed is:—

A seed selecting mechanism comprising a hopper having openings 2 and 3 in its bottom wall at different distances from its center, a rotary plate arranged immediately above said bottom and having pairs of apertures at different distances from its center and adapted to be moved into registration with the openings in the bottom wall, a stationary plate arranged in the hopper immediately above the rotary plate and having arcuate openings at different distances from its center and also having upstanding lugs above and at angles to said openings and an upstanding lug adjacent to its center; the first-named lugs being adapted for the detachable connection of covering strips and the second-named lugs for the detachable connection of a partition, housings carried by said stationary plate, and spring-pressed scrapers and spring-pressed knockers in said housings; one scraper and one knocker being employed in each of the arcuate openings.

In testimony whereof I affix my signature.

ROBERT A. VEST.